Patented May 23, 1933

1,910,836

UNITED STATES PATENT OFFICE

ALPHONS O. JAEGER, OF CRAFTON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

ANTICOMBUSTION PROCESS

No Drawing. Application filed July 7, 1928. Serial No. 291,143.

This invention relates to anti-combustion processes which prevent the starting of fires and serve to extinguish fires already started.

Combustion is an oxidation reaction of carbon-containing compounds and as such follows the same laws which govern the partial oxidation of organic compounds to intermediate products, which processes are normally carried out at temperatures below ignition temperatures in the presence of catalysts or contact masses which permit the process to be carried out at temperatures considerably below those encountered in ordinary combustion. In my copending application, Serial No. 196,393, filed June 3, 1927, I have described processes for the partial oxidation of organic compounds or selective oxidation of impurities wherein the action of the contact mass is stabilized by the addition thereto of compounds of the alkali metals, alkaline earth metals and strongly basic earth metals. The effect of these compounds when used in conjunction with an oxidation contact mass is to lower its tendency to produce total combustion and, therefore, to minimize losses from this source. I have found that this anti-combustion property of the compounds of the alkali forming metals can be used not only to reduce the tendency of combustion in a partial catalytic oxidation but also to stop ordinary combustion which has been accidentally started or to prevent combustion from starting. In other words, the alkali forming metal compounds may be considered as anti-combustion catalysts and as such can be used both for extinguishing and preventing fires.

When used as a fire extinguisher the compounds are preferably applied to the seat of combustion in a finely distributed form, for example in solution or suspension in liquids which possess fire extinguishing properties or which will not support combustion. Thus, the effectiveness of water is greatly increased by dissolving in it compounds of the alkali forming metals which act as anti-combustion catalysts when sprayed onto a fire. Excellent results are also obtained by dispersions of the anti-combustion catalysts in non-aqueous fire extinguishing fluids, such as carbon tetrachloride and the like. In some cases it is not readily practicable to dissolve the alkali forming metal compounds in some of the non-aqueous liquids and in such cases finely divided suspensions may be used.

Important as is the use of alkali forming metals for fire extinguishers, their use for fire prevention is perhaps even greater. Thus, for example, combustible material may have disseminated through it compounds of the alkali forming metals. It should be understood that the present invention has nothing in common with the fire proofing processes in which ammonium or similar salts have been used which decompose at elevated temperatures with the absorption of large quantities of heat with or without the evolution of gases which will not support combustion. The present invention is based on the catalytic action of compounds as such and not on their heat absorption or on their evolution of blanketing gases.

A particularly important field of utility of the present invention lies in its use for the prevention of accidental conflagrations when crude organic materials are being heated or sublimed; thus, for example, when crude phthalic anhydride from the vapor phase oxidation of naphthalene is subjected to prolonged heating for condensation or polymerization of quinonoid impurities or subjected to sublimation in order to separate its constituents, there is a considerable fire danger as it is not economically feasible to carry out all of these processes in an atmosphere of an inert gas. The material will usually also contain small amounts of iron oxide or similar metal oxides which act as combustion catalysts and even though the temperature may be far below the ignition point fires sometimes arise from the accidental presence of small amounts of combustion catalysts. If, however, a small percentage, which may range from a half a percent up to as much as 8 or 10%, of an alkali forming metal compound is distributed throughout the phthalic anhydride, the combustion activity of combustion catalysts present is completely damped or stabilized so that fires do not tend to arise.

A similar important field lies in the heating of other products of partial oxidation such as, for example, anthraquinone, maleic acid, naphthalic anhydride, and the like.

A further field of great economic importance lies in distillation of coal tar or of its fractions and particularly sublimation of fractions, such as napthalene, anthracene, and the like. Coke products are almost always present and it has been found that finely divided carbon is an excellent combustion catalyst. When, however, alkali forming compounds are present in sufficient amounts the combustion activity of any combustion catalysts present is damped or removed completely and distillations and particularly sublimations which hitherto have always presented a danger of fire can be carried out with a maximum of safety by using the principles of the present invention.

Since the catalytic method of combustion prevention or extinguishing does not necessarily require the use of fluids, such as water, it is eminently satisfactory for the extinguishing of oil fires as there is no tendency to spread the oil.

While all alkali forming metal compounds are anti-combustion catalysts, some are better than others and I have found, for example, that the phosphates, sulfates, chlorides and carbonates of potassium and sodium are peculiarly effective. Alkaline earth metal compounds are also effective and as many of them are extremely cheap they present some economic advantages in certain cases. The invention is, therefore, not limited to the use of the alkali metals or sodium potassium compounds, although in its more specific embodiments sodium and potassium compounds and particularly sodium potassium compounds of oxygen containing acid radicals constitutes a specific feature of the invention.

The invention will be described in greater detail in connection with a few specific examples.

*Example 1*

Crude phthalic anyhdride from the vapor phase oxidation of naphthalene is treated with from half a percent to 5% of potassium sulfate which should be incorporated in a finely divided form. The phthalic anhydride is then subjected to prolonged heating in order to render quinonoid and similar impurities non-volatile, and then sublimed or distilled off. The operation can be carried out with complete safety even in an iron still which may be quite rusty, an important consideration because thus the cheapest kind of apparatus may be utilized and it is not necessary to provide linings or coatings of more expensive metals or of non-metallic substances. It is also of advantage to inactivate the walls of the apparatus, for example the reflux condenser when, as is usual, the prolonged heating is carried out under refluxing conditions, in order to prevent catalytic combustion from taking place where surfaces contact with the vapors of the substances and where, of course, there is normally no anti-combustion catalyst. Instead of using potassium sulfate other potassium compounds, such as potassium chloride or acid phosphate may be used. It is also possible to use sodium compounds such as sodium sulfate, sodium chloride, and the like. When such substances are used no fire danger is encountered in discharging the hot still residue and distillation can be carried out without exclusion of air.

*Example 2*

Coal tar is distilled after admixing about half a percent of potassium carbonate or 1% of sodium chloride or sulfate with the material. There is no tendency to combustion even when the still is opened as the activity of the coke formed is damped and neutralized by the presence of the anti-combustion catalyst.

*Example 3*

A crude naphthalene fraction is sublimed in a stream of air after about a quarter to 1% of potassium bisulfate or one half to 2% of sodium bisulfate or sulfate has been added. Sublimation takes place without fire danger and can be carried to a further extent as the residue even when subjected to higher temperatures to vaporize the last traces of the naphthalene does not present a fire danger. The walls of the apparatus may advantageously be inactivated by treatment with potassium bisulfate or potassium phosphate or with the corresponding sodium compounds.

*Example 4*

Crude anthracene admixed with about half to 1% of sodium or potassium sulfate or with a small amount of calcium sulfate is sprayed into a hot stream of air and vaporized, the non-volatile substances removed and the vapor-air mixture passed through a converter for catalytic purification of the anthracene by selective combustion of carbazole. There is no danger of fire starting in the vaporizer due to the presence of minute quantities of metal oxides, particularly colloidal iron oxide in the crude anthracene.

In a similar manner, other organic compounds can be vaporized for catalytic purposes in an air stream without the fire danger when an anti-combustion catalyst is incorporated with them.

In the foregoing examples typical processes have been illustrated involving the distillation and vaporization of combustible organic materials. It is known to purify such materials, and notably crude phthalic anhydride, by heating them with condensing agents in order to effect polymerization and condensation of impurities, and for this purpose alkalies and other compounds of alkali forming metals have been used. The present invention is not concerned with the purification of such materials, and the use of alkali forming metal compounds having properties which enable them to serve as condensing agents is hereby expressly disclaimed. It will be readily appreciated that many alkali forming metal compounds which are not condensing agents, such as sodium chloride and the like, are much cheaper than even the cheapest condensing agents, and since for anti-combustion purposes they must be used in relatively larger quantities, the factor of cost is an important consideration.

This is in part a continuation of my copending application Serial No. 196,393, filed June 3, 1927 now Patent 1,709,853, dated April 23, 1929.

What is claimed as new is:

1. An anti-combustion process, which comprises associating with crude fusible combustible material at least one alkali forming metal compound which is not a condensing agent in amounts sufficient to act as an anti-combustion catalyst, but insufficient to act as a smothering agent.

2. An anti-combustion process, which comprises associating with crude fusible combustible material at least one alkali metal compound which is not a condensing agent in amounts sufficient to act as an anti-combustion catalyst, but insufficient to act as a smothering agent.

3. An anti-combustion process which comprises associating with crude fusible combustile material an alkali metal compound which is not a condensing agent in amounts from ½ to 8% by weight of the combustible material.

4. A method of preventing fires in the vaporization of crude organic materials, which comprises associating with the organic material to be vaporized a compound of an alkali metal which is not a condensing agent in amounts sufficient to act as an anti-combustion catalyst, but insufficient to act as a smothering agent.

5. A method of preventing fires in the vaporization of crude organic materials, which comprises associating with the organic material to be vaporized a compound of an alkali metal which is not a condensing agent in amounts ranging from ½ to 8% by weight of the material to be vaporized.

6. An anti-combustion process, which comprises associating sodium chloride with crude fusible combustible material in amounts sufficient to act as an anti-combustion catalyst, but insufficient to act as a smothering agent.

7. An anti-combustion process, which comprises associating sodium chloride with crude fusible combustible material in amounts ranging from ½ to 8% by weight.

8. A method of preventing fires in the vaporization of crude organic materials which comprises associating sodium chloride with the organic material in amounts sufficient to act as an anti-combustion catalyst, but insufficient to act as a smothering agent.

9. A method of preventing combustion in processes of heating crude phthalic anhydride under vaporizing conditions, which comprises associating with the crude phthalic anhydride an alkali metal compound which is not a condensing agent in amounts sufficient to act as an anti-combustion catalyst, but insufficient to act as a smothering agent.

10. A method of preventing fires in the vaporization of organic materials, which comprises associating sodium chloride with crude organic material to be vaporized in amounts ranging from ½ to 8% by weight.

11. A method of preventing combustion in the processes of heating crude phthalic anhydride under vaporizing conditions, which comprises associating sodium chloride with the crude phthalic anhydride in amounts sufficient to act as an anti-combustion catalyst, but insufficient to act as a smothering agent.

12. A method of preventing combustion in the processes of heating crude phthalic anhydride under vaporizing conditions, which comprises associating sodium chloride with the crude phthalic anhydride in amounts ranging from ½ to 5% by weight.

Signed at Pittsburgh, Pennsylvania this 6th day of July, 1928.

ALPHONS O. JAEGER.